United States Patent [19]

Carlin

[11] Patent Number: 5,209,106

[45] Date of Patent: May 11, 1993

[54] LEAK DETECTOR FLOAT SYSTEM AND METHOD THEREFOR

[75] Inventor: John A. Carlin, Denver, Colo.

[73] Assignee: ProEco, Inc., Tampa, Fla.

[21] Appl. No.: 736,406

[22] Filed: Jul. 26, 1991

[51] Int. Cl.[5] ............................................. G01M 3/16
[52] U.S. Cl. ........................................ 73/49.2; 73/319
[58] Field of Search .......................... 73/49.2, 305, 319

[56] References Cited

U.S. PATENT DOCUMENTS 3,898,555  8/1975  Tellerman ............................. 324/34
4,850,223  7/1989  Carlin et al. .......................... 73/49.2

FOREIGN PATENT DOCUMENTS 8900164  8/1990  Netherlands ......................... 73/305

OTHER PUBLICATIONS

Balluff Inc.—Product Scope—Catalogue Number 010 E—Issue 8909 MTS—Sensors Division—Temposonics®II Linear Displacement Transducer.
Balluff—Preliminary Description—Series BTL—P Transducer with Digital counter card BTA-P.

Primary Examiner—Hezron E. Williams
Assistant Examiner—Joseph W. Roskos
Attorney, Agent, or Firm—Dorr, Carson, Sloan & Peterson

[57] ABSTRACT

An improved leak detection float system for use in underground storage tank containing fuel wherein the float system utilizes an elongated hollow test probe extending downwardly into an underground storage tank and into the fuel stored therein. A microprocessor is contained in an upper compartment of the test probe along with control electronics. A rod is centrally affixed in the lower portion of the test probe and a float is disposed around the rod, but within the test probe so as to float on the surface of the fuel. The float uses tapered edges to minimize offset error due to surface tension. An excitation transducer is placed above the float on the rod which produces vibrational waves down the rod having a predetermined frequency, power, and duration. The vibrational wave breaks the surface tension existing between the float and the fuel so that the float can obtain a position within the fluid based upon the buoyancy of the float in the fluid. The breaking of the surface tension by vibrational wave minimizes any offset between the float and the fluid caused by surface tension.

21 Claims, 8 Drawing Sheets

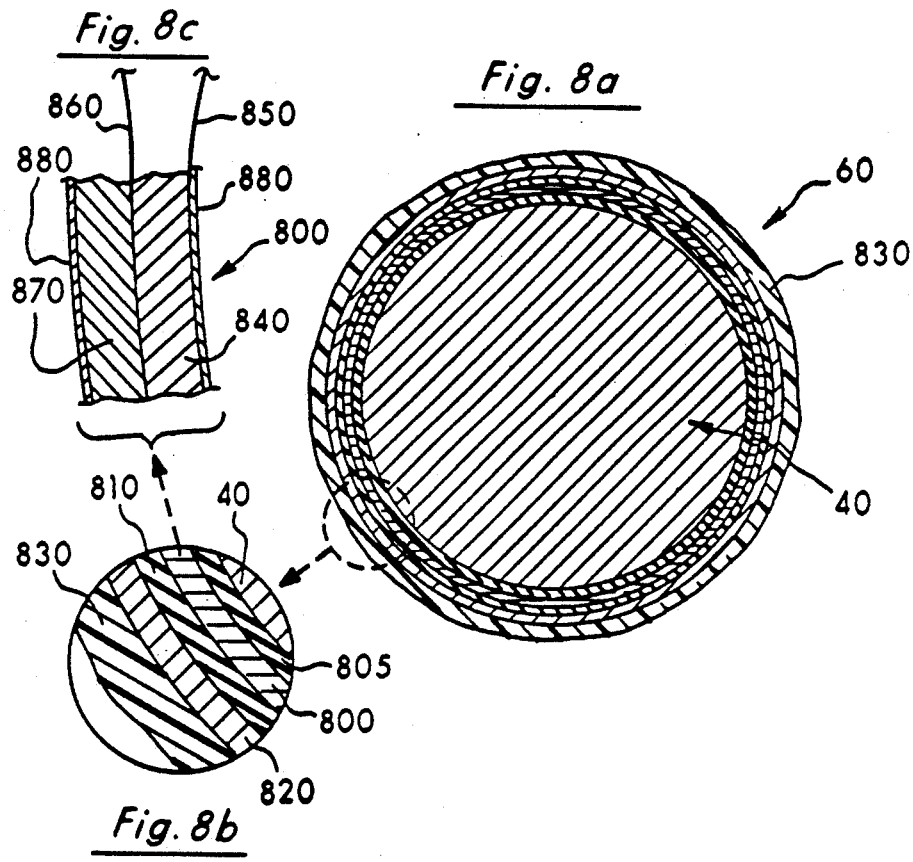
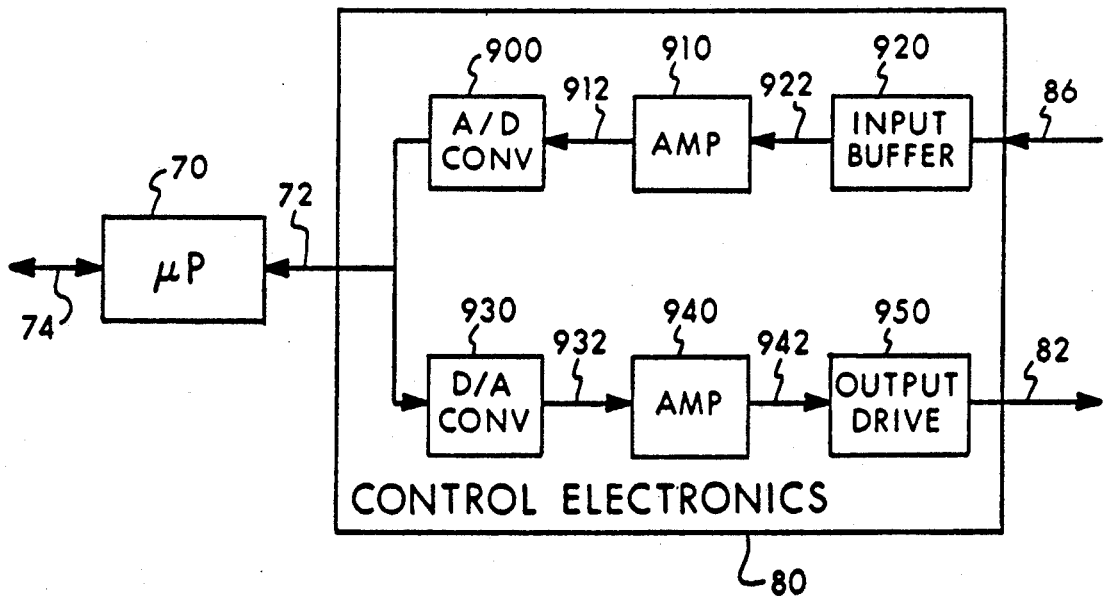

LEAK DETECTOR FLOAT SYSTEM AND METHOD THEREFOR

BACKGROUND OF THE INVENTION

1. Field of the invention

The present invention pertains to a float system for detecting leaks in storage tanks and, in particular, a float system minimizing the effects of surface tension for detecting leaks in underground tanks that store hydrocarbon products with high precision.

2. Statement of the Problem

In U.S. Pat. No. 4,850,223 the inventor set forth a novel system for detecting, collecting and processing data regarding the leakage rate of underground storage tanks. As set forth in this patent, it is necessary that the leak detection apparatus for an underground storage tank be extremely sensitive so that it can detect leaks in the range of 0.02 gallons per hour or less. The sensitivity of this measurement becomes further complicated since it is extremely difficult to detect the loss (or gain) of 0.02 gallons of fluid per hour in an underground storage tank capable of storing 10,000 gallons or more such as is commonly found in gas stations. For example, in a nine foot diameter tank twenty-one feet long which is half full, the removal of one gallon of gasoline lowers the fluid level 0.00629 inches. The loss of 0.02 gallons per hour would cause a fluid level drop of 0.0001257 inches or 125.7 micro inches per hour. It is difficult to measure changes in fluid level of this magnitude due to the cross-sectional area of the surface being about 27,000 square inches. At 95 percent full, which is the ideal level for testing tanks volumetrically, the cross-sectional area is still very large being about 16,000 square inches. In order to measure accurately such a change in fluid level, various factors such as temperature, vibration, etc. must be taken into account or, hopefully, minimized. A need exists to increase the sensitivity of this leak detection by about 100 percent to a level capability of 50 microinches.

A problem exists with respect to the interaction between the float and the fluid. In U.S. Pat. No. 4,850,223, an elongated cylindrical float was utilized. Three wheels were attached to the upper end of the float and three wheels were attached to the lower end of the float so as to allow the float to ride within a tubular probe. A need exists to eliminate the use of wheels which contact the interior of the tubular probe and, furthermore, a need exists to minimize or significantly reduce the effect of surface tension between the fluid and the float. The overall problem to be satisfied, therefore, is to provide a float that provides greater precision in detecting the true level of the fluid in the tank.

A need exists to provide a float design which floats within the tube without touching the tube and one that inherently minimizes the surface tension between the float and the fluid. Furthermore, a need exists to insure that the float will always be in its true buoyancy position based upon the specific gravities of the float and the fluid without any change in the true buoyancy position due to surface tension. The effect of surface tension becomes more important when the level of fuel changes. The dropping (or rising) of fuel due to a leak in the tank may actually not be detected in the short time interval due to the float maintaining its position due to residual surface tension or due to the float reorienting into an exaggerated position also due to surface tension. Hence, a need exists to insure that the float will always assume a true buoyancy position with respect to surface tension and the level of the fluid before obtaining a level reading.

3. Solution to the Problem

The present invention provides a solution to the above problem and directly satisfies each of the needs set forth with respect to the problem. First, the float is designed to float within the tube without touching the inner surfaces of the tube. Second, the float of the present invention utilizes a geometric design having a plurality of different tapered surfaces to minimize and to substantially reduce the effects of surface tension between the float and the fluid. Finally, the float of the present invention is vibrated just before a level reading is obtained in order to allow the float to assume the true buoyancy position with respect to the fluid before a level reading is obtained.

SUMMARY OF THE INVENTION

An improved leak detection float system for use in underground storage tank containing fuel wherein the float system utilizes an elongated hollow test probe extending downwardly into an underground storage tank and into the fuel stored therein. A microprocessor is contained in an upper compartment of the test probe along with control electronics. A rod is centrally affixed in the lower portion of the test probe and a float is disposed around the rod, but within the test probe so as to float on the surface of the fuel without touching the inner surfaces of the tube and minimizing contact with the rod. An excitation transducer is placed above the float on the rod which produces vibrational waves down the rod having a predetermined frequency, power, and duration. The vibrational wave breaks the surface tension existing between the float and the fuel so that the float can obtain a position within the fluid based upon the buoyancy of the float in the fluid. The breaking of the surface tension by vibrational waves substantially minimizes any offset between the float and the fluid caused by surface tension. A true reading of the fluid's level can then be obtained.

A transducer sensor is also provided above the excitation transducer for measuring the resultant signal's power, frequency and duration of the vibrational wave on the rod. The measured signals are delivered back into the microprocessor as feedback so that the microprocessor can determine resonance. When resonance is achieved, the amount of energy required to produce the vibrational signal is minimized which is important since the electronics and the transducers are battery operated.

The float of the present invention is designed to have a plurality of angled sides so as to minimize surface tension between the outer body of the float and the fuel and the inner body of the float and the fuel. A centering plate is also utilized in an annular region of the float so as to center the float over the rod and to keep the surfaces of the float from touching the tube and to minimize contact with the rod.

DESCRIPTION OF THE DRAWINGS

FIG. 8a-8c are cross-sectional views of the feedback sensor of the present invention;

FIG. 9 is a block diagram of the electronics of the present invention;

DETAILED SPECIFICATION

1. Environment

Figure 1:
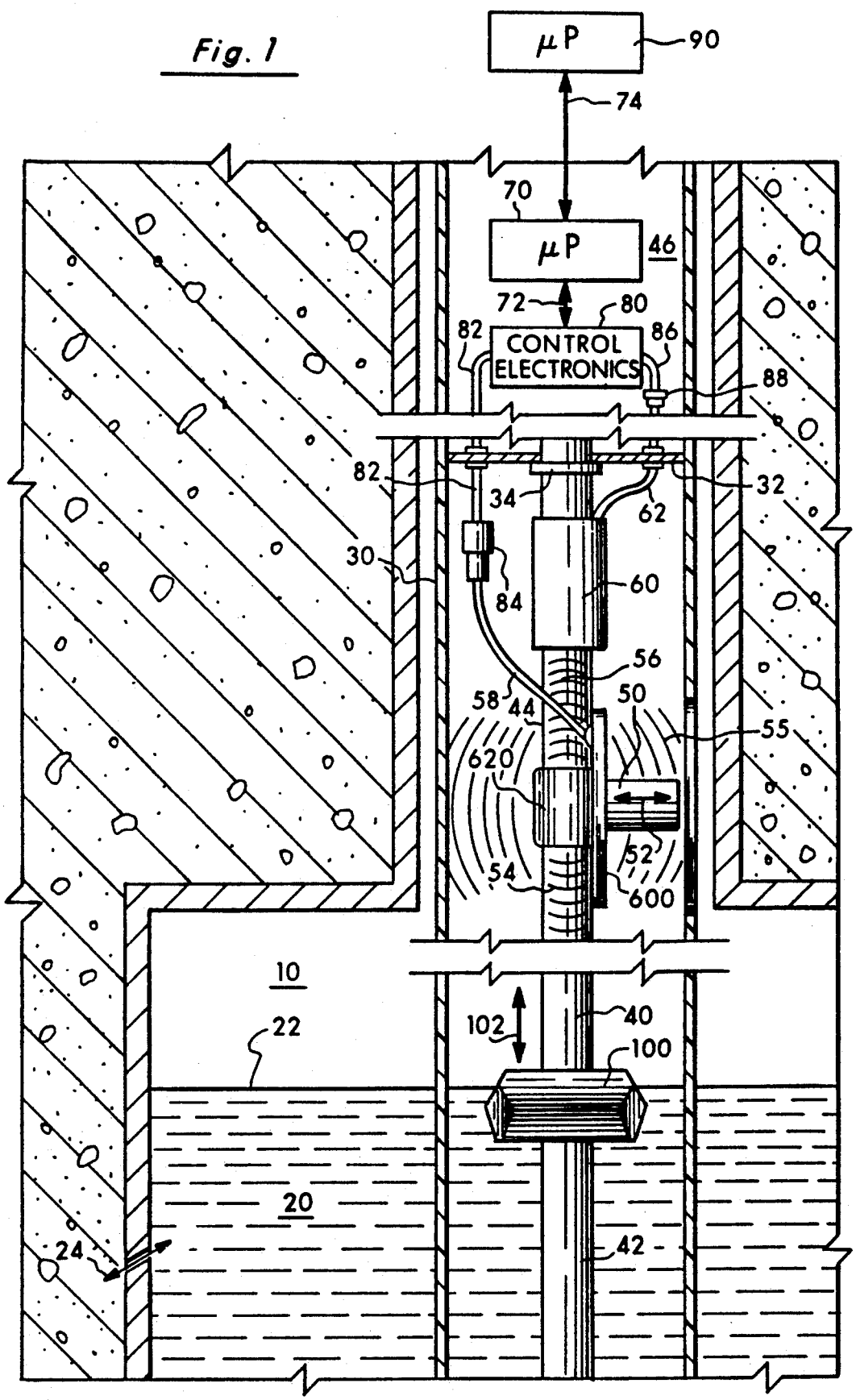
FIG. 1 sets forth the overall components of the float system of the present invention.

In FIG. 1, the environment for the present invention is shown. A storage tank 10 is shown containing a fluid 20 such as gasoline. An elongated hollow test probe assembly 30 is inserted to extend downwardly into the underground fuel storage tank 10 as conventionally mentioned in the aforesaid patent. The fluid has obtained a certain level 22 in the tank and the tank 10 may have a leak 24 which causes flow into or out from the tank 10. The leak 24 over time would cause the level 22 to raise or lower accordingly.

The test probe 30 is hollow and contains a centrally disposed rod 40 affixed 34 to a support 32. Disposed on a lower portion 42 of the rod 40 is the float 100 of the present invention which floats upwardly or downwardly in the direction of arrow 102 dependent upon the level 22. Also disposed on an upper portion 44 of the rod 40 is an excitation transducer 50 which functions to impart vibrations in the direction of arrow 52 to the rod 40 and to the gaseous medium 55 around the rod. These vibrations travel as vibrational waves 54 downwardly in the direction of arrow 102 to the float 100 and the measurement area 23 there around and upwardly as vibrational waves 56. The vibrational waves 54 and 56 have a given power, frequency, and duration and travels at the speed of sound.

Disposed above the excitation transducer 50 on the upper portion 44 of the rod 40 is an excitation feedback sensor 60 which functions to sense the presence of the upwardly traveling waves 56. Electrical wires 58 are interconnected with the excitation transducer 50 and electrical wires 62 are connected to the excitation feedback sensor 60.

Disposed in an upper compartment 46 of the test probe 30, as taught in the aforesaid above patent, is a sealed and secured set of electronics comprising a microprocessor 70 and control electronics 80. The control electronics 80 interconnects over leads 82 through connector 84 to wires 58 to transducer 50 and over wires 82 through connector 88 to 62 to sensor 60. Hence, the control electronics 80 delivers and receives electrical analog vibration signals to the excitation transducer 50 and to the excitation feedback sensor 60. Microprocessor 70 and the control electronics 80 are fully contained within compartment 46 of the test probe 30 as in the aforesaid patent. The microprocessor 70 over a communication path 72 delivers and receives digital vibration signals from the control electronics and it further communicates over path 74 with a field processor 90 to receive programming instructions and to upload acquired test data. Field computer 90 is selectively connected to probe 30 only during upload operations. The probe 30 operates under control of microprocessor 70 during gathering of test data. The details of the compartment and the delivery of the wires 82 and 86 are not necessary to the teachings of the present invention. The rod 40, transducer 50, and float 100, in the preferred embodiment form part of the level measurement system which is based upon a magnetostrictive linear displacement transducer of the type manufactured by Balluff Inc., 8125 Holton Drive, Florence, Ky. 41042 as the SERIES BTL-P ® liner displacement transducer or by MTS Systems Corp., Research Triangle Park, N.C. 27709 as TEMPSONICS II ® linear displacement transducer.

As will be explained in the following, the design of the float 100 is critical in reducing or minimizing surface tension interactions with the fluid 20 and secondarily, the utilization of vibrational waves 54 to vibrate the rod 40 and float 100 just prior to a level reading is important to insure that the float 100 buoyancy with respect to the level 22 of the fluid 20 is not affected by surface tension.

It is to be expressly understood that the system shown in FIG. 1 is adapted to improve upon the contained fuel tank level detection system of the aforesaid patent. However, the present invention has application in any measurement system using a float where it is desired to substantially eliminate offset errors due to surface tension between the float and the fluid.

2. Float 100

Figure 2:
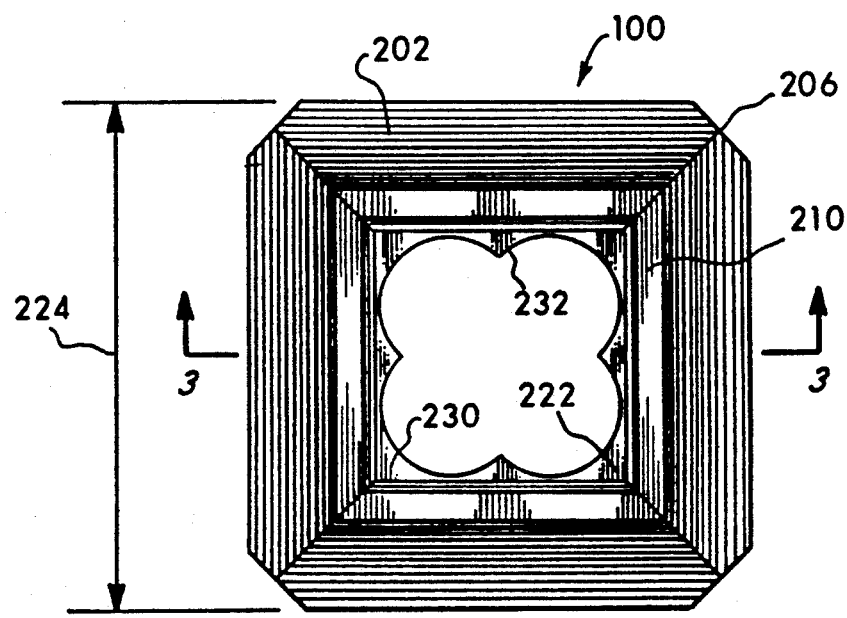
FIG. 2 is a top planar view of the float of the present invention.

The float 100 of the present invention is detailed in FIGS. 2 through 5. In FIG. 2, a top planar view of the float of the present invention is shown. The float 100 includes a float body 200, positioning inserts 210, magnets 220, and a centering plate 230.

Figure 3:
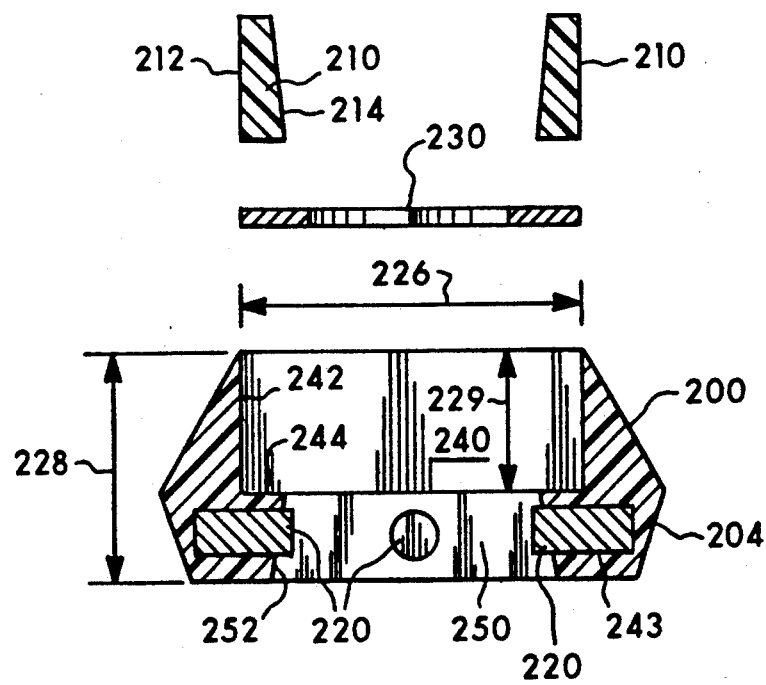
FIG. 3 is a cross-sectional view of the float of FIG. 2.

As shown in FIG. 3, the float body 200 in the shape of an outer support ring can be manufactured from wood (such as balsa wood) a suitable plastic or foam material, or formed from hollow shells such as formed plastic. The float body 200 has a first inner square cavity 240 and formed recesses 242 which are receptive of centering plate 230 and inserts 210. Beneath square cavity 240 is a second formed square cavity 250 which has inwardly tapering sides 252 and formed circular receptacles 243 which hold magnets 220. The float body 200 has its upper regions designed to minimize the surface tension between it and the fluid in which it is disposed. The lower regions are designed to move easily in the fluid. This will be discussed subsequently As shown in FIGS. 2 and 3, four magnets 220 are press-fittingly inserted into the formed circular receptacles 243 in the center of each side 252 of the formed square opening 250. These magnets are used in the float 100 as part of a linear displacement transducer level measuring system. The magnets could be of circular or square cross-section depending upon the design of the implementation. In the preferred embodiment, the magnets 220 are of circular cross-section and are 1500 Gauss. The magnets 220 could have either its North pole directed inwardly or its South pole depending on the design implementation. While the preferred embodiment places the magnets 220 in the center of each wall 252, it is to be expressly understood that the magnets 220 could be placed at any position provided they are equally spaced from each other. For example, the magnets 220 could be located at the corners 206 of the float body 200. In the preferred embodiment, the body 200 has an outer dimension 224 of 1.125 inches and an inner dimension 226 of 0.750 inches for the formed square 240. The height of the float is 228 of 0.500 inches. The height 229 of the formed square opening is 0.3125 inches.

Figure 5:
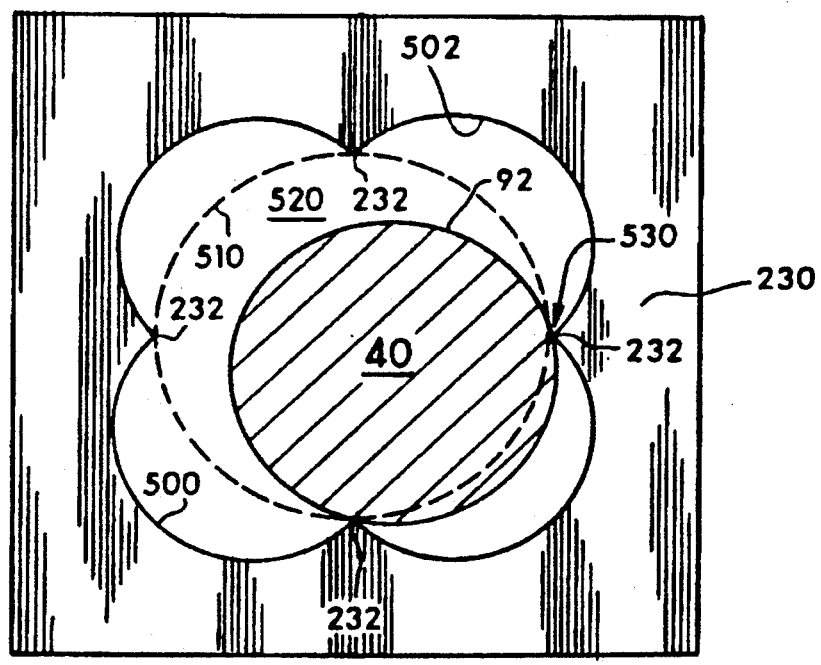
FIG. 5 is a top planar view of the centering plate of the present invention.

A centering plate 230, as shown in FIGS. 2, 3, and 5 press-fits into the square cavity 240 and abuts the bottom 244 of the cavity 240. In the preferred embodiment, the centering plate 230 is made from aluminum and is formed to have four centering apexes 232 which in the preferred embodiment and as shown in FIG. 2, is centered over each of the magnets 220. The centering plate can be made from any suitable material. In the preferred embodiment, the centering plate 230 is 0.020 inches thick and is constructed according to the details shown in FIG. 5.

In FIG. 5, four half circles 500 are formed within the plate 230 so as to create the apexes 232. In the preferred embodiment, a circle 510 abutting the apexes 232 has a diameter of 0.46 inches. The rod 40 of the present invention has a diameter of 0.375 inches and, therefore, easily fits within the opening 520 of the plate 230. Each half circle 500 has a diameter of any suitable value provided that it is less than the diameter of the rod 40 and provided that the four separate apex points 232 as shown in FIG. 5 are formed. Each half circle 500 is truly a half circle.

As shown in FIG. 5, the centering plate 230 in the float 100 may abut the rod 40 at two of the four apexes 232. It could abut any combination of two adjacent apexes 232. Three advantages are obtained. First, the apexes insure that the inner surfaces of the float are maintained a predetermined distance away from the rod so as to minimize surface tension between both the rod 40 and float 100 and with the surface 22 of the fluid 20. Secondly, and as noted in FIG. 5, at the point of contact 530 with an apex 232, the fluid surface 22 between the rod 40 and the tapered inner wall 214 of insert 210 is prevented from becoming too small which would enhance the effect of surface tension. The centering plate 230 is positioned within the body of the float so as to be below the fluid level 22 and it functions to prevent the float 100 from being trapped in surface tension. This enables the surface tension between the fluid and surfaces 92 and 214 to be easily broken. Third, the rod 40 prevents the float from contacting the inner surfaces of the tube 30. Thus, apexes 232 acts as means to limit the float becoming within close proximity to any other surfaces, such as the vertical surfaces of the inner wall of probe 30 or outer surface of rod 40, which do not have the added benefit of angularized design as is the body 200 of the float 100.

The diameter of the half circle 500 in the preferred embodiment is 0.3245 inches. It is to be expressly understood that the centering plate 230 of the present invention could have any suitable dimension according to the teachings of the present invention. Furthermore, while half circles 500 are used, it is to be understood that other geometric shapes could also be used. For example, the apexes could be triangular in shape or simply cylindrical posts.

As shown in FIG. 3, positioning inserts 210 are provided to firmly hold the centering plate 230 in position within the float body 200. In the preferred embodiment, four positioning inserts 210 are utilized and can either be glued to the inner surface 242 of the formed squared opening 240 or they may be press-fit. As shown in FIG. 3, each insert has a linear side 212 with an opposing tapered side 214. The tapering side 214 provides a tapered surface to the inside of the float 200—again to minimize surface tension.

It is to be expressly understood that while a square shaped float is shown, that the teachings of the present invention are independent of the geometric shape of the float 100 and that a circular float, or a hexagonal float (or any regular polygon), could also be similarly formed.

Figure 14:
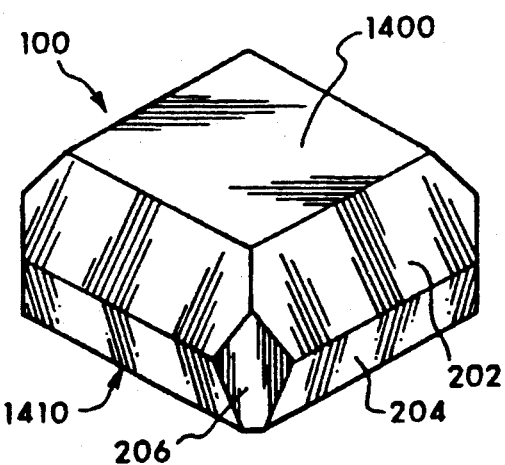
FIG. 14 sets forth an alternate embodiment for the float wherein the float of the present invention is formed without a central annular region.
Figure 16:
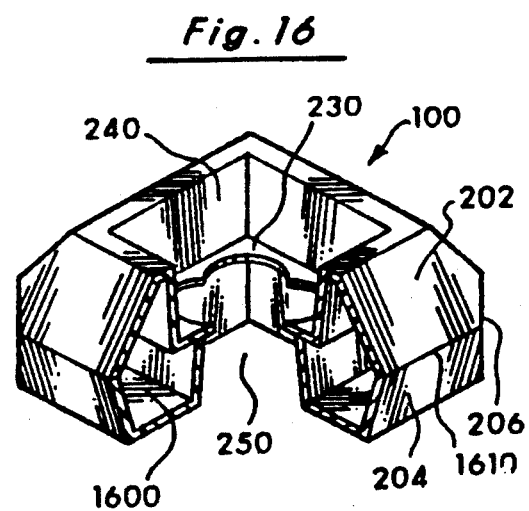
FIG. 16 is an alternate embodiment of the float used in FIG. 15 having a hollow interior.

Furthermore, it is to be expressly understood that while a float 100 composed of different separate components such as a float body 200, four positioning inserts 210, and a separate centering plate 230, that the entire float could be formed in plastic from one or more molds. The magnets 220, however, would still be inserted into corresponding formed receptacles 243 or holders. In FIGS. 14 and 16, alternate embodiments of the float 100 of the present invention are shown. In FIG. 14, the float 100 does not have inner cavity form annular regions 240 and 250 and has a flat upper surface 1400 and a flat bottom surface 1410. In FIG. 16, the float 100 is formed entirely of plastic so as to have a hollow center 1600. In such an arrangement, the top portion having sides 202 can be formed in one plastic piece with the bottom having sides 204 form a second plastic piece The two halves are then connected together at seam 1610. In this embodiment, the plate 230 is also formed with one of the two halves. Depending upon the type of measuring technology, magnets may or may not be used with the floats of FIGS. 14 and 16.

Figure 4:
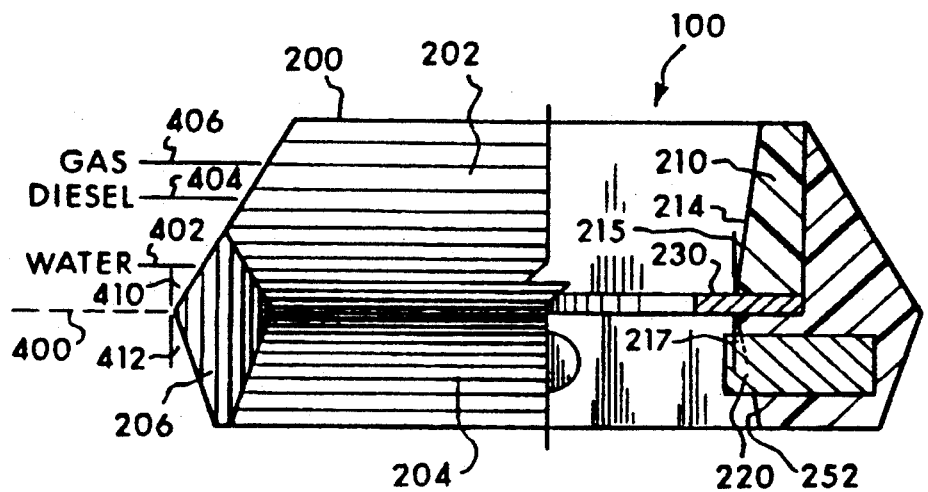
FIG. 4 is a partial side planar/cross-sectional view of the float of FIG. 2.

In FIG. 4, the body 200 of the float 100 is detailed. Body 200 has a number of different tapered outer surfaces: an upper tapered outer surface 202, a lower outer tapered surface 204, and a corner surface 206 which is not tapered. FIG. 4 also shows the inner tapered surfaces 214 on the inserts 210 and 252 of the lower formed opening 250. All surfaces both outward and inward are tapered except the corners 206.

The float 100 of the present invention is designed so that the point of greatest outward dimension 400 is below the fluid that the float is disposed in. For example, if the float 100 were placed in water, the water line would be typically at 402; if placed in diesel, the line would be 404; and if placed in gasoline, the gasoline would be at line 406. The precise location of course depends on the specific gravity of the float in relation to the specific gravity of the fluid which causes the buoyancy position to change.

Lines 402, 404, and 406 represent the natural buoyancy level of the float 100 to the fluid without any offsets due to surface tension. The object of this invention is always position the float 100 so that it is at its natural buoyancy level before a fluid level reading is taken. This is accomplished, in part, by the float 100 having tapering edges to minimize surface tension and, in part, by the vibration of the float before reading the fluid level.

Since the intended application is either in gasoline or diesel, it is apparent that when the float 100 is placed in those fluids, and as shown in FIG. 4, the inner and outer tapered surfaces of the float are important with respect to minimizing surface tension. In the preferred embodiment, the angle 410 of the outer surface 202 is 27°. The angle 412 of the lower surface 204 is 18°. Angles 215 and 217 are 12° and 15° respectively. Angles 410 and 215 are selected for their ability to engage surface 22 so as to minimize surface tension. Angles 412 and 217 compliment this design in giving the float 100 ease of movement through the fluid. The cut surface 206 functions to provide the largest possible float size to be contained in the round tube 30. It is to be expressly understood that these are preferred angles and that other angles could also be used under the teachings of the present invention.

In conclusion, all of the inner and outer surfaces of the float are tapered except the corners so as to minimize surface tension. As will be explained subsequently, when the float 100 is vibrated, the float 100 buoys itself to the correct level of the fluid in which it is immersed (i.e., level 404 for diesel).

The float set forth in FIGS. 2–5 is designed to reduce the amount of surface tension not only between the rod but also between the tube. The float 100 can be made of any suitable material and can be square, circular, or of any regular polygon shape. While the dimensions of the present invention are preferred and were experimentally obtained so as to minimize the surface tension with the rod and the tube, other suitable dimensions could also be utilized.

The float 100, in the preferred embodiment, uses a set of magnets 220 as part of a non-contact, magnetostrictive linear displacement transducer to measure the position of the float in the fluid. It is to be expressly understood that the float of the present invention is not to be limited in its teachings by the presence of magnets 220. For example, the magnets are not needed when a laser measurement system uses a beam of laser light to strike the upper surface of the float. The use of a laser beam represents an alternative approach to the measurement of the position of the float which would provide higher resolution to a magnetostrictive approach.

Figure 13:
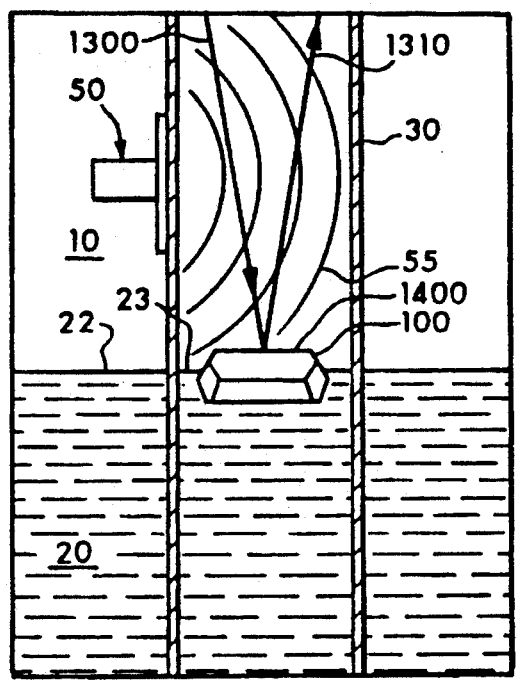
FIG. 13 illustrates an alternate embodiment of the float system of the present invention utilizing a guide tube with the float disposed therein.
Figure 15:
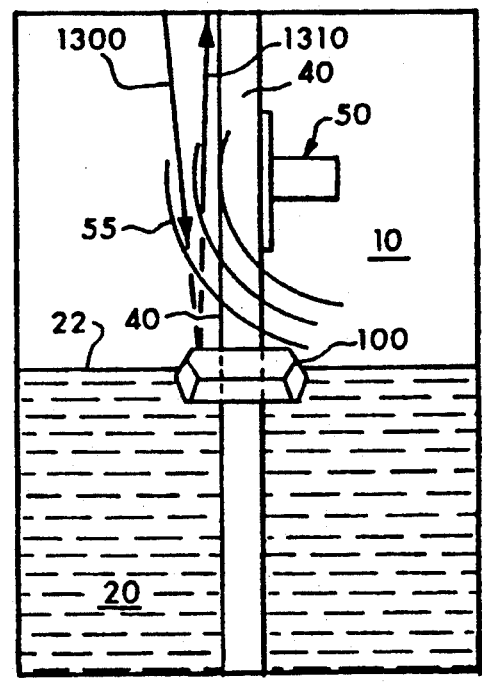
FIG. 15 is an alternate embodiment of the float system of the present invention wherein the float is disposed only around a rod without the use of a test probe.

In FIGS. 13 and 15, two alternate embodiments of the float system of the present invention are shown. In FIG. 13, the float 100 is disposed within the interior of the probe or hollow tube 30. In this embodiment, the tube 30 acts as a guide for the float 100 to contain the float in the fluid 20. A laser beam 1300 is directed after vibration onto the upper surface 1400 of the float and the reflected laser beam 1310 is received so as to measure the position of the float 100. A laser beam 1300 and reflected laser beam 1310 are exaggerated in this illustration for purposes of discussion. The excitation transducer 50 produces vibrational waves 55 to vibrate the float 100 in the contained area within the guide and the fluid surface 22 so as to break surface tension as will be more fully discussed subsequently. In FIG. 15, the float 100 is simply disposed over the rod 40 which also contains the float in the fluid. An outer tube 30 is not utilized. Again, the float is positioned on surface 22 of the fluid 20 and the transducer 50 produces vibrational waves 55 so as to eliminate surface tension offset error in the area 23 of containment. Again, a laser beam 1300 is directed after vibration onto the upper surface of the float 100 and reflected 1310 so as to provide a level measurement. According to the teachings of the present invention, the embodiments of FIG. 1, 13, and 15 provide an approach wherein the float 100 is contained in a region where vibrational waves can be applied so as to break surface tension in the measurement area 23 and substantially minimize offset error. In FIG. 1, the rod 40 and the tube 30 cooperate to confine the float 100 in a region where the vibrational waves are directed, in FIG. 13, only the tube 30 is utilized to provide the containment, and in FIG. 15, only the rod 40 is used to provide the containment

3. Excitation Transducer 50

Figure 6:
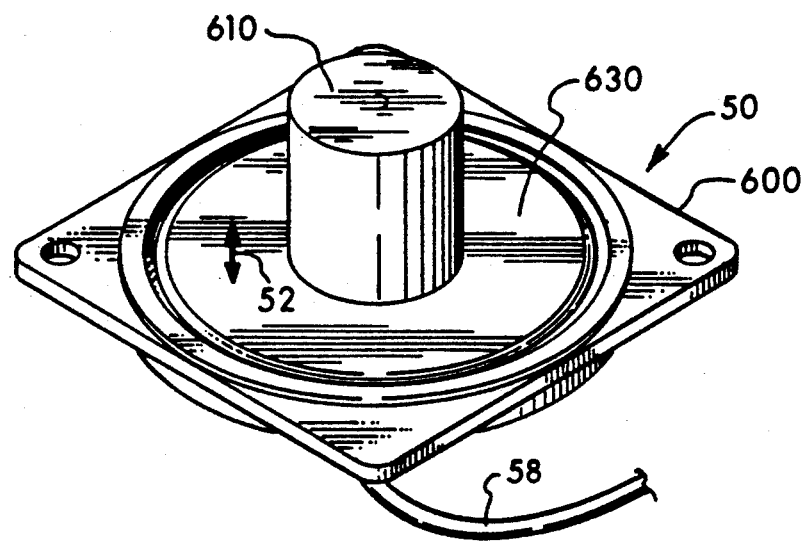
FIG. 6 is a top perspective view of the excitation transducer of the present invention.
Figure 7:
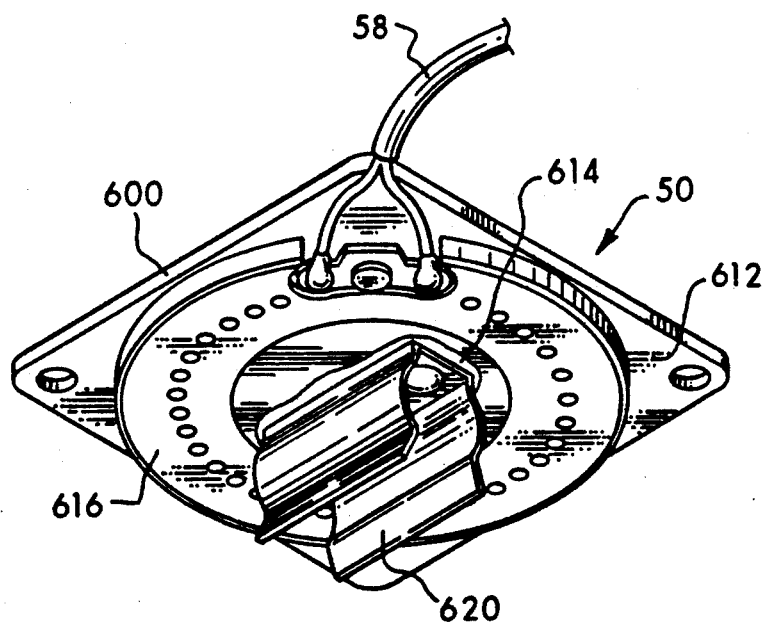
FIG. 7 is a bottom perspective view of the excitation transducer shown in FIG. 6; feedback sensor of the present invention.

In FIGS. 6 and 7, the excitation transducer 50 is shown. In FIG. 6, a frame 600 supports the vibrator disk 630. The back surface 612 of the frame 600 has affixed thereto a clip 620. The clip 620 is capable of firmly gripping the rod 40. A weight 610 is mounted to the circular vibrator 630 which is also capable of moving in the direction of arrow 52. As previously discussed, the excitation transducer 50 is of an electromagnetic design which is modified, under the teachings of the present invention, to vibrate the rod 40. Modification includes the addition of the clip 620 which is affixed (for example by means of gluing 614) to the back surface 612 of the frame. The glue 614 is designed to be impervious to the fuel 20. A weight 610 is also glued to circular vibrator disk 630 to provide greater inertia for vibration of the rod. Attached to the front side of frame 600 at its circumference, is vibrator disk 630. The vibrator disk 630 (with the weight 610) is the only thing that moves when the excitation wave form 1200 is applied. The other components (620, 600) are firmly attached to rod 40. The resultant vibrational waves 54 and 56 are exclusively due to the "freedom" of motion 52 of disk 630.

It is to be expressly understood that while a electromagnetic transducer is shown in FIGS. 6 and 7, that any suitable device for vibrating the rod 40 as set forth in FIG. 1 could be utilized under the teachings of the present invention and the present invention is not to be limited by the specific embodiment utilized. The object of the present invention is to provide vibrational waves 54 and 56 down and up the rod 40. The downwardly directed vibrational wave 54 breaks the surface tension between the float 100 and the surface 22 of the fluid 20. This will be discussed in greater detail subsequently.

The entire transducer 50 can be encapsulated in a material such as fluorocarbonsilicon which is flexible enough to permit vibration.

4. Excitation Feedback Sensor 60

In FIG. 8, the excitation feedback sensor 60 is detailed. The Kynar (TM) piezoelectric film, Model No. DT1-028K is applied as the manufacturer, Pennwalt Corporation, Piezo Film Sensor Division, Valley Forge, Pa. recommends. In the preferred embodiment, around the outer surface of rod 40 is a layer of insulation 805. Next is placed the piezoelectric assembly 800, and a second layer of insulation 810 is applied. The entire assembly is epoxied within a protective layer 820 and finally a jacket of shrink tubing 830 makes an outer skin which allows for a clean installation. The assembly 800 is comprised of the Kynar piezo film element 840 which has a negative lead 850 attached to it on one side and a positive lead 860 attached to it on the other side. Leads 850 and 860 comprise the wire 62 in FIG. 1. A layer of insulation 870 is applied to the positive potential side of the piezo film 840 as shown in FIG. 8. A jacket of aluminum foil 880 completely surrounds the piezo film (making contact on the negative potential side) and insulation to complete the assembly 800. The purpose of the aluminum foil 880 is to provide shielding to reduce spurious noise to the piezo film element 840. The insulation could be of any material, for example cellophane tape, and as is the aluminum foil and shrink tubing are all conventionally available from many sources.

5. Control Electronics

In FIG. 9, the block diagram showing the control electronics 80 is set forth. Control electronics 80 includes an analog to digital (A/D) converter 900 interconnected to an amplifier 910 which in turn receives signals from an input buffer 920. The control electronics 80 also includes a digital to analog (D/A) converter 930 interconnected with an amplifier 940 and an output drive 950 as shown in FIG. 9. The control electronics 80 is interconnected to the microprocessor 70 over bus 72.

Figure 12:
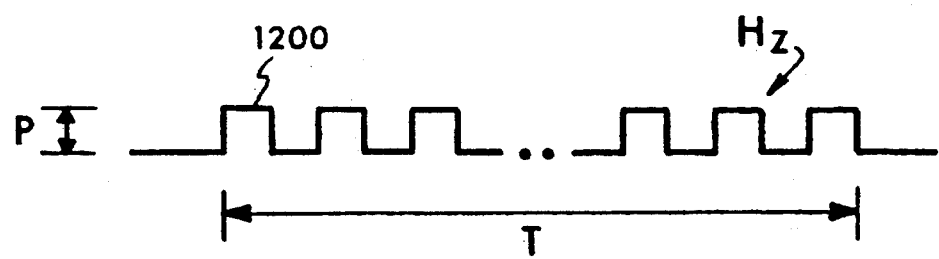
FIG. 12 illustrates the square wave analog vibration signal.

In a driving mode of operation, the microprocessor 70 configures a vibrational wave form having a predetermined frequency, power and duration. This is shown in FIG. 12 as a square wave 1200. The square wave 1200 has a given power P, a given frequency Hz, and a duration T. While the present invention utilizes a square wave as shown in FIG. 12, it is to be expressly understood that any suitable wave shape could be utilized under the teachings of the present invention and that the present invention is not to be limited to the use of square waves.

As will be discussed in the operation of the present invention, the power P, the duration T, and the frequency Hz, can be selectively varied by the microprocessor 70. Such variations can be individually performed (such as varying only the power) or all three parameters can be varied at the same time. Digital signal values corresponding to the power P and frequency Hz are delivered over bus 72 to the D/A converter 930 where the circuit 930 converts the digital signals into corresponding analog vibrational signals on lead 932. These analog vibrational signals are amplified by amplifier 940 and delivered onto leads 942. The output drive circuit 950 then delivers the amplified signals onto line 82 for delivery into the excitation transducer 50 which converts the analog vibrational signals into waves 54 and 56.

The present invention utilizes frequencies in the range of 1 to 999 Hz, a duration of 1 to 9999 milliseconds and a power between 1 to 100 percent. In the preferred embodiment, the variables are set to 200 Hz, 3000 milliseconds, and 50 percent power. It is to be understood that frequencies higher than 999 Hz could be used under the teachings of the present invention. Furthermore, the frequency, amplitude, and duration do not need to be constant. For example, the frequency could be varied from 100 Hz to 200 Hz over the 3000 millisecond duration or the power could be varied from 25 percent to 50 percent or both frequency and power could be varied.

The sensor 60 senses the vibrational waves 56 and converts it into analog vibrational signals for delivery onto leads 86 which are received by the input buffer circuit 920 for delivery of the received analog vibrational signals onto line 922. The amplifier 910 amplifies these signals and delivers the amplified analog signals onto line 912 for delivery into the A/D converter 900 which digitizes the analog signal for delivery into the microprocessor 70.

It is to be expressly understood that the individual components set forth in FIG. 9 for the control electronics 80 are of conventional design and represent a preferred embodiment. Other suitable designs could be utilized under the teachings of the present invention for conversion of digital signals into corresponding analog signals and vice versa. Also, digital signals of frequency "Hz" may be delivered directly to transducer 50 for a given duration "T" with no consideration for varying power "P." In this case, the use of A/D and D/A converters would be eliminated so as to reduce the cost of implementation.

6. Excitation—Feedback Operation

Figure 10:
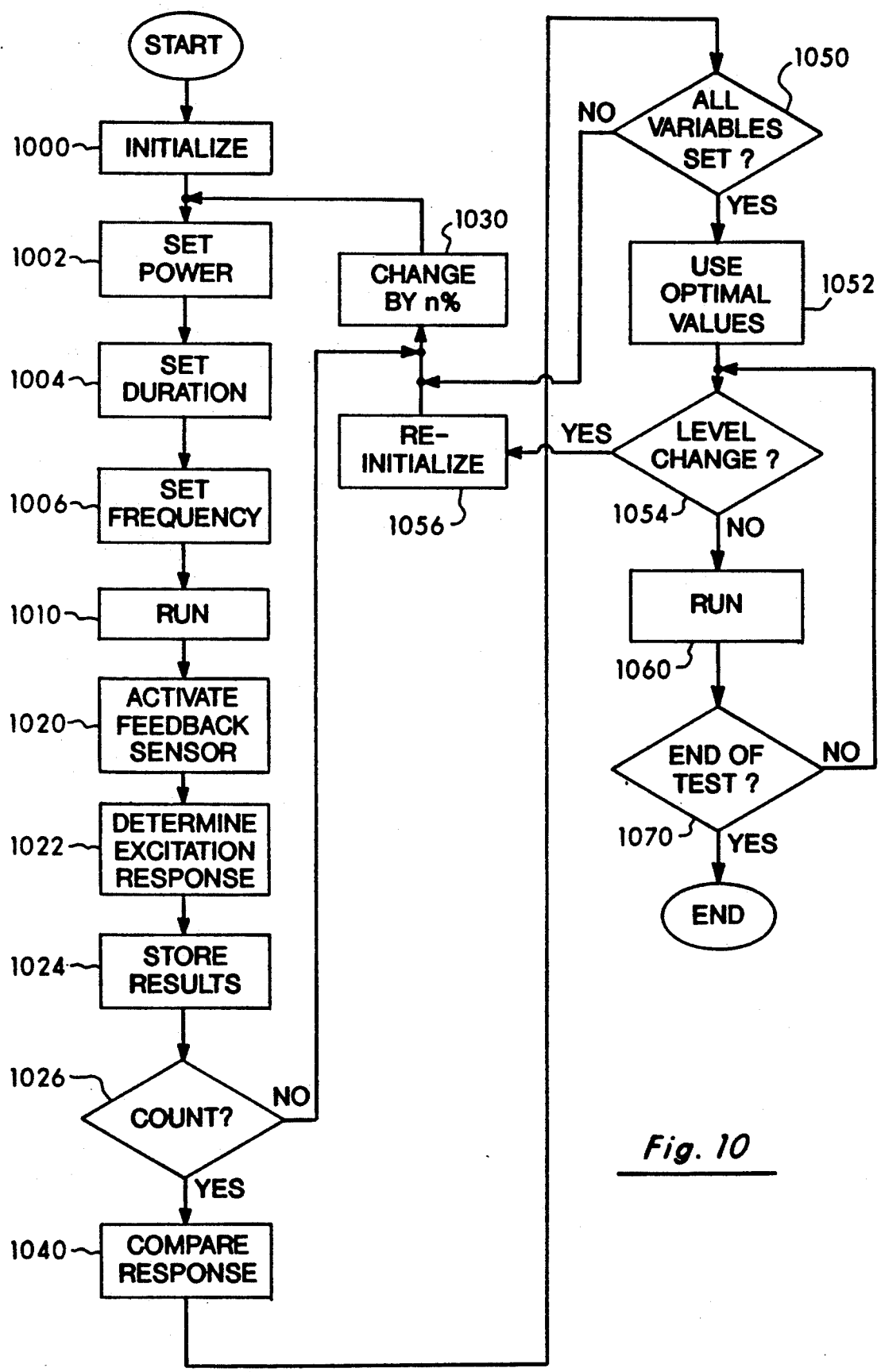
FIG. 10 is a flow diagram setting forth the operation of the present invention.

In FIG. 10, the operation of the present invention is set forth in the illustrated flow chart which is representative of software contained within the microprocessor 70.

Upon start-up, the system is initialized in stage 1000 and the power, duration, and frequency of the vibrational wave 54 is set in stages 1002, 1004, and 1006. The optimum run sequence is then entered in stage 1010. In this stage, the microprocessor 70 delivers digital vibrational signals to the control electronics 80 over lines 72. These digital vibrational signals are converted into corresponding analog vibrational signals which are delivered over lines 82 and 58 into the excitation transducer 50 which then functions to produce the vibrational wave 54 and 56. This vibrational wave has a predetermined power as set in stage 1002, has a predetermined frequency as set in stage 1006, and is of a predetermined duration as set in stage 1004.

The system then enters stage 1020 which activates the feedback sensor 60. In stage 1022, the sensed analog values of the vibrational wave 56 are delivered over lines 62 and 86 into the control electronics and are converted from an analog signal into a corresponding digital signal. In stage 1024 the microprocessor stores the sensed effect of the setting of power, duration, and frequency as manifested as the vibrational wave 56.

In stage 1026, a decision is made as to whether or not a predetermined count has occurred. Upon start-up the count in stage 1026 is equal to zero. Hence, stage 1030 is entered wherein the value of the power, duration, and frequency are changed by a fixed percentage (i.e., n percentage). Stages 1002, 1004 and 1006 modify the value of power, duration and frequency and change it by n percent (i.e., either increase or decrease). Stage 1010 is then entered again and the feedback values are measured and stored by the microprocessor. In the preferred embodiment, this occurs five separate times (i.e., count=5) and the microprocessor stores five separate feedback values. It is to be understood that any predetermined amount for the count could be used.

Stage 1040 is then entered which compares and evaluates the five separate stored feedback values with the set values so as to make a determination as to which setting in stages 1002, 1004, and 1006 brings the feedback values closest to resonance. Resonance is important under the teachings of the present invention so as to minimize the energy required to vibrate the rod 40. In the underground storage tank environment, the microprocessor and control electronics as well as the transducer are all battery powered and it is a secondary goal of the present invention to minimize the energy required to vibrate the rod 40 by seeking a resonance point. The continued sequencing through the count feedback loop as discussed above provides a software mechanism for determining an optimum value for power, duration, and frequency which minimizes the energy required to vibrate the rod 40 and thus most efficiently operates the system.

It is to be expressly understood that a number of variations on the above discussed operation could be made which would still fall within the teachings of the present invention which concentrates on the importance of vibrating the float 100 so as to minimize the effects of surface tension. First, the optimization loop based upon the count could be eliminated for those designs where conservation of battery energy is not required. In this mode of operation, the count stage 1026 could be simply eliminated as well as stage 1030. Under this mode of operation, fixed values for power, duration, and frequency are programmed into the microprocessor and are simply used to generate the vibrational wave 54.

In another mode of operation, the count optimization loop discussed above could be modified so that each individual parameter of power, duration, and frequency are separately adjusted or are adjusted in other combinations (only power and duration, or only duration and frequency, or only power and frequency). This would permit energy optimization based upon adjusting one or a combination of parameters. For example, the frequency (or power) could be selectively ramped to increase by a fixed amount during the time duration.

Stage 1040 selects the feedback signal which represents the optimum energy savings signal (i.e., closes to resonance or perhaps at resonance). Again, a number of different software routines could be utilized in stage 1040 to do this comparison and optimization. Indeed, it is to be expressly understood that rather than changing the parameters of power, duration, and frequency by a fixed amount such as n percent, stage 1040 could calculate a change value which could be directly inputted into stages 1002, 1004, and 1006. Again, this is a matter of design choice and a number of different conventional comparison and feedback software routines could be utilized under the teachings of the present invention without departing from the overall concept of vibrating the float 100 and minimize surface tension.

Stage 1050 is then entered and a decision is made as to whether or not the variables of power, duration, and frequency are set. If they are not, then the initialization process continues.

In stage 1052 the optimum values as determined in stage 1040 are then selected Stage 1054 is entered and a decision is made as to whether or not the level 22 of the fluid has changed. If the level has changed (indicating that resonance may have changed), then stage 1056 is entered and a re-initialization of the process described above occurs. This will be elaborated on in more detail later. However, it is important to recognize that when the fluid level changes more than a predetermined amount, then new values for power, duration, and frequency may be necessary to obtain greatest sufficiency or to most nearly approach resonance. Again, this feature is not necessary under the teachings of the present invention and stages 1054 and 1056 could be eliminated. In this mode of operation, the originally set values for power, duration, and frequency are continued to be used. If the level has not changed more than a predetermined amount, then stage 1060 is entered which is the run sequence. The run sequence in stage 1060 also repeats stages 1020, 1022, and 1024.

Stage 1070 is then entered to determine whether or not enough level readings have been completed to verify the existence or non-existence of a leak. If the end of the test has not been reached, stage 1054 is re-entered and this loop continues until the test is ended at which point the routine is exited.

7. Obtaining True Buoyancy

To appreciate the reduction of surface tension exhibited by the float 100 of the present invention, it is necessary to briefly discuss what causes "surface tension." A molecule in the interior of a body of fluid experiences on an average no resultant forces from the other fluid molecules, since it has, on average, equal numbers of molecules on all sides. The molecule will have an average translational kinetic energy that depends on the temperature of the fluid and which within limits is independent of pressure in the fluid. However, a molecule that approaches the surface of the fluid experiences a large resultant force directed back into the fluid. The existences of this force is manifested in the phenomenon of surface tension. The surface molecules are continually being pulled back into the fluid and new molecules are coming out from below to take their places.

Velocity distribution among the molecules in a fluid is such that there are some that approach the surface 22 that in spite of the retarding forces and, therefore, they escape through the surface and enter the vapor. This is evaporation. The number of molecules that have sufficient kinetic energy to evaporate increases rapidly as the temperature of the fluid is raised.

Conversely, vapor molecules that strike the fluid surface 22 enter the fluid, since it immediately experiences large forces pulling it into the fluid. This is an effect of condensation. At any given vapor temperature, the number of molecules striking a surface is proportional to the vapor pressure For molecules well inside the fluid, while these forces will fluctuate because of thermal agitation, they will average out to zero so that the molecule can move about in the fluid without doing any net work against these forces. However, a molecule near the surface of a fluid is subject to a resultant force directed back into the fluid. A molecule at the surface can thus be considered as having potential energy greater than that of a molecule in the interior by the work that has been done against this force in bringing the molecule from the interior of the fluid to the surface. A fluid thus has a surface potential energy proportional to its surface area.

Some of the consequences of surface tension are very familiar. It is because of surface tension that fluid films and bubbles can exist; that fluid droplets assume spherical form; that droplets can 'hang' at the end of a faucet; that a fluid will 'climb' a capillary tube that it wets and be depressed in one that it does not wet. In general a fluid meniscus does not meet a solid surface horizontally. It is to be noted that the above examples involve surface energies of a fluid in contact with a solid as well as the surface energy of a fluid in contact with air. It is these different surface energies that determine the behavior of fluids in contact with solids.

With respect to flotation, Archimedes' relationship states that a fluid acts on a foreign body immersed in it with a net force that is vertically upward and equal in magnitude to the weight of the fluid displaced by the body. This upward force is called the buoyant force.

The surface of a fluid as it meets all other materials, such as a float or a containment vessel, is lined with a meniscus. This meniscus is concave if the fluid wets the container or float walls and convex if it does not. This manifests itself also as the fluid level within the container which may rise or fall. As a result of all these forces on a floatation device, it is clear that the flotation device does not always float in its true buoyancy relationship in a fluid and other containment materials. A floatation device may 'hang' and be trapped stationary while subtle changes in fluid level are taken place, e.g., fluid evaporation, condensation, expansion, contraction due to temperature changes, or, in the case of the present invention, the tank leaking 'in' or 'out.' Only after significant changes take place does the force of gravity or buoyancy overcome the forces of surface tension and the meniscus at the fluid's edges, will conventional floats respond. The effect on the float is much like a 'stepping' of its placement as to the surface relationship rather than a clean linear movement In this application, this stepping is termed as offset error. Further, if the fluid surface should change its direction several times over a period of time, the float may become hopelessly 'lost' within this hysteresis region of surface tension rather than tracking these subtle changes as a fact of the behavior of the tank of fluid. Conventionally, data from such floats is generally unreliable when high resolution is required as in storage tanks.

In the present invention careful design has been considered in the shape of the float 100 so as to minimize any resultant forces which may trap the float 100 in the surface tension. Slopping sides and corners help reduce this effect. A means to limit the 'closeness' of the float to other surfaces also retards the forces which may tend to undesirably impede free movement of the float. In the micro world of measurement as the present invention performs, no 'stepping' or 'stiction' of float movement is tolerable. To effectively precision track tank level changes, the physics involved with respect to surface tension must be specifically addressed, else the true tank behavior may be masked.

A second important characteristic of the improved leak detector float of the present invention is the vibration or excitation of the float just prior to a reading so as to insure that the float is precisely aligned with respect to the fluid despite the presence of surface tension.

Figure 11:
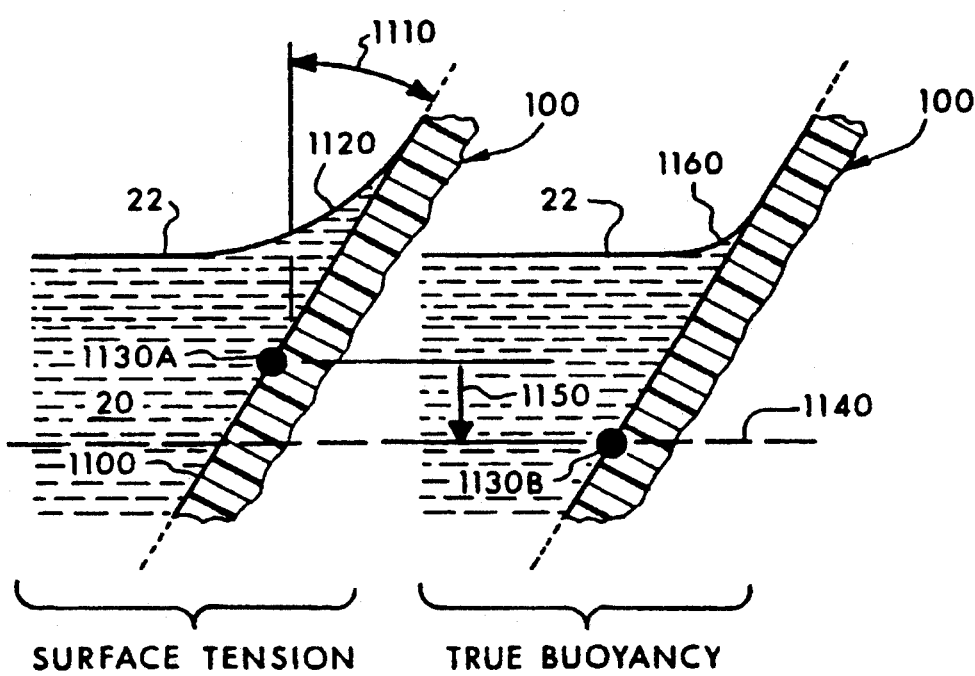
FIG. 11 is an illustration showing reduction due to the effect of surface tension in the positioning of the float in the system of the present invention.

In FIG. 11, the goal of the present invention is illustrated to show both features of the present invention. The first feature pertains to providing a tapered surface 1100 on the float 100 with the fluid 20. As shown in FIG. 11, the tapered surface 1100 forms an angle 1110 with the surface 22 of the fluid 20. This angle 1110, as discussed previously, can be of any suitable design and the float 100 has a number of different angles 111 around the surface of the float and on the interior of the float. As fully discussed, the purpose of the angle 1110 is to provide a divergent surface with respect to the level 22 of the fluid 20. This minimizes surface tension in the area of the meniscus 1120. As shown in FIG. 11, the meniscus 1120 is for a situation where the float 100 is wet (or where the fluid 20 is dropping due to temperature decreasing or where fluid is leaking out).

In FIG. 11, a reference point 1130 is placed on the float 100. The reference point 1130 is necessary to explain how the float 100 of the present invention obtains true buoyancy and minimizes offset error due to surface tension. In FIG. 11, the float 100 occupies a vertical position with respect to a reference line 1140. For purposes of discussion, the true buoyancy reference line 1140 is based upon the specific gravity of the float with respect to the fluid. Under the presence of surface tension, the float 100 may occupy a first position with respect to the reference line 1140 wherein the reference point 1130A is above the reference line by a distance 1150. This position of the float is due to the effects of surface tension pushing the float 100 upwardly, or holding static above the level 22 of the fluid 20.

After vibration occurs, the reference point 1130 is lowered by an amount 1150. While the forces of surface tension still exists, the meniscus 1160 is a lot smaller and the float 100 occupies substantially a true buoyancy position 1140 based only upon the specific gravity of the float and the specific gravity of the fluid 20. In short, the upward offset 1150 caused by the surface tension in meniscus 1120 is substantially eliminated.

Hence, reference point 1130A illustrates the float 100 lifted upwardly by the forces within the surface tension of the fluid 22. After vibration of the float 100, position 1130B represents substantially the true buoyancy of the float 100 within the fluid 20 based only upon the specific gravities of the float and the fluid Measurement of the float then occurs to determine the level of the fluid. Although illustrations in FIG. 11 show the meniscus being concave, which is indicative of float surface 1100 being wet or body of fluid decreasing, the same is true in the opposite sense where the meniscus may be convex due to a non-wetting surface or the body of fluid increasing.

It is to be expressly understood that the claimed invention is not to be limited to the description of the preferred embodiment but encompasses other modifications and alterations within the scope and spirit of the inventive concept.

I claim:

1. An improved leak detecting float system for use in a storage tank (10) containing fluid (20) to measure the level of said fluid, said float system comprising:

a float (100) for floating on the surface (22) of said fluid (20), means (30, 40) disposed vertically in said fluid for containing said float in a measurement area (23) on said surface, means (46, 80, 50) operative upon said containing means for producing a vibrational wave (55) onto said float, said vibrational wave breaking any surface tension existing between said float and said fluid to orient said float in said fluid based upon the buoyancy of said float in said fluid so as to substantially minimize any offset error due to said surface tension before measuring the level of said fluid.

2. An improved leak detecting float system for use in a storage tank (10) containing fluid (20), said float system comprising:

a float (100) for floating on the surface (22) of said fluid (20), means (30, 40) disposed vertically in said fluid for containing said float in a measurement area (23) on said surface, means (46, 80, 50) operative upon said containing means for producing a vibrational wave (55) onto said float, said vibrational wave breaking any surface tension existing between said float and said fluid to orient said float in said fluid based upon the buoyancy of said float in said fluid so as to substantially minimize any offset error due to said surface tension, and wherein said containing means further comprises:

an elongated hollow test probe (30) extending downwardly into said storage tank and into said fuel, a rod 140 centrally disposed in a lower portion (42) of said test probe, said float being positioned over said rod.

3. The improved float system of claim 2 further comprising:

means (60) located on said rod above said producing means in said test probe for sensing the presence of said vibrational waves from said producing means, said sensing means generating sensed analog vibration wave signals, means (80) receptive of said sensed analog vibration wave signals for converting said sensed analog signals into sensed digital vibrational wave signals, means (70) receptive of said sensed digital vibrational signals from said converting means for comparing said sensed digital vibrational signals to said produced vibrational waves, said comparing means selectively changing said produced vibrational wave until resonance is obtained.

4. The improved float system of claim 2 wherein said float comprises:

a body (200), said body having a plurality of angled sides so as to minimize surface tension between said body and said fluid, said body having a formed annular opening through which said rod is disposed, said annular opening having angled sides so as to minimize surface tension between said formed angular opening and said fluid.

5. The improved float system of claim 4 wherein said float comprises:

a centering plate (230) affixed in said body and centrally positioned within said formed annular opening, said centering plate having a plurality of apexes (232) inwardly directed in said formed annular opening and directed towards said rod, said plurality of inwardly directed apexes on said centering plate preventing said float from contacting the outer surface of said rod.

6. The improved float system of claim 5 wherein the peripheral shape of said body is:

formed in a substantial square, the peripheral shape of said formed annular opening being formed in a substantial square coextensive with said peripheral shape of said body.

7. The improved leak detecting system of claim 4 wherein said float comprises:

a first set of tapered edges on its upper surface of said body which taper outwardly from said float at substantially the center of said float and a second set of edges on the bottom of said body which tapering outwardly at substantially said center, said float having predetermined value of specific gravity that buoys said float in said fluid to align the level of said fuel in the region of said first set of edges.

8. The improved float system of claim 4 wherein said body is formed from a plastic shell having a hollow interior.

9. The improved float system of claim 2 wherein said float comprising:

a body having a plurality of angled sides so as to minimize surface tension between said body and said fluid.

10. An improved leak detection float system for use in an underground storage tank (10) containing fluid (20), said float system comprising:

an elongated hollow test probe (30) extending downwardly into said underground storage tank and into said fluid, a microprocessor (70) disposed in an upper compartment (40) of said test probe, control electronics (80) disposed in said upper compartment of said test probe and connected to said microprocessor, a rod (40) centrally disposed in a lower portion (42) of said test probe, a float (100) disposed around said rod and within said test probe for floating on the surface (22) of said fluid, means (50) located on an upper portion of said rod within said test probe between said control electronics and said float for producing a vibrational wave (55) down said rod, said vibrational wave vibrating said rod to break the surface tension existing between the float and said fluid to orient said float in said fluid at a substantial level based upon the buoyancy of said float in said fluid, said vibrational wave having at least one predetermined frequency (Hz), at least one predetermined power (P), and at least one predetermined duration (T), said microprocessor containing reference frequency, power and duration digital signal values corresponding to said at least one predetermined frequency, power and duration, said control electronics receiving said digital signals from said microprocessor for converting said digital signals into corresponding analog vibrational signals, said producing means receptive of said analog signals for producing said vibrational wave.

11. The improved float system of claim 10 further comprising:

means (60) located on said rod between said producing means and said control electronics in said test probe for sensing the presence of said vibrational wave from said producing means, said sensing means generating sensed analog vibration wave signals, said control electronics receptive of said sensed analog vibration wave signals for converting said sensed analog signals into sensed digital vibrational wave signals, said microprocessor receptive of said sensed digital vibrational signals from said converting means for comparing the power, wave shape, and duration to said reference digital vibration signals, said microprocessor selectively changing the power, the frequency, and the duration of said produced vibrational wave until resonance is obtained.

12. The improved float system of claim 10 wherein said float comprises:

a body (200), said body having a plurality of angled sides so as to minimize surface tension between said body and said fluid, said body having a formed annular opening (240, 250) through which said rod is disposed, said annular opening having angled sides so as to minimize surface tension between said formed angular opening and said fluid, a centering plate (230) affixed in said body and centrally positioned within said formed annular opening, said centering plate having a plurality of apexes (232) inwardly directed in said formed annular opening and directed towards said rod, said plurality of inwardly directed apexes on said centering plate preventing said float from contacting the outer surface of said rod.

13. The improved float system of claim 12 wherein the peripheral shape of said body is:
   formed in a substantial square, the peripheral shape of said formed annular opening being formed in a substantial square coextensive with said peripheral shape of said body.

14. The improved leak detecting system of claim 12 wherein said float comprises:
   a first set of tapered edges on its upper surface of said body which taper outwardly from said float at substantially the center of said float and a second set of edges on the bottom of said body which tapering outwardly at substantially said center, said float having predetermined value of specific gravity that buoys said float in said fluid to align the level of said fluid in the region of said first set of edges.

15. An improved leak detection float system for use in an underground storage tank (10) containing fluid (20), said float system comprising:
   an elongated hollow test probe (30) extending downwardly into said underground storage tank and into said fluid,
   a rod centrally disposed in a lower portion of said test probe,
   a float (100) disposed around said rod and within said test probe for floating on the surface (22) of said fluid,
   means (50) located on an upper portion (44) of said rod within said test probe between said control electronics and said float for producing a vibrational wave (55) down said rod, said vibrational wave vibrating said rod to break the surface tension existing between the float and said fluid to orient said float in said fluid at a substantial level based upon the buoyancy of said float in said fluid, said vibrational wave having at least one predetermined frequency, at least one predetermined power, and at least one predetermined duration.

16. The improved float system of claim 15 further comprising:
   means (60) located on said rod above said producing means in said test probe for sensing the presence of said vibrational wave from said producing means, said sensing means generating sensed analog vibration wave signals,
   means (80) receptive of said sensed analog vibration wave signals for converting said sensed analog signals into sensed digital vibrational wave signals,
   means (70) receptive of said sensed digital vibrational signals from said converting means for comparing the power, wave shape, and duration to said predetermined digital vibrational signals, said comparing means selectively changing the power, the frequency, and the duration of said produced vibrational wave until resonance is obtained.

17. The improved float system of claim 15 wherein said float comprises:
   a body (200), said body having a plurality of angled sides so as to minimize surface tension between said body and said fluid, said body having a formed annular opening through which said rod is disposed, said annular opening having angled sides so as to minimize surface tension between said formed angular opening and said fluid,
   a centering plate (230) affixed in said body and centrally positioned within said formed annular opening, said centering plate having a plurality of apexes (232) inwardly directed in said formed annular opening and directed towards said rod, said plurality of inwardly directed apexes on said centering plate preventing said float from contacting the outer surface of said rod.

18. The improved float system of claim 17 wherein the peripheral shape of said body is:
   formed in a substantial square, the peripheral shape of said formed annular opening being formed in a substantial square coextensive with said peripheral shape of said body.

19. The improved leak detecting system of claim 17 wherein said float comprises:
   a first set of tapered edges on its upper surface of said body which taper outwardly from said float at substantially the center of said float and a second set of edges on the bottom of said body which tapering outwardly at substantially said center, said float having predetermined value of specific gravity that buoys said float in said fluid to align the level of said fluid in the region of said first set of edges.

20. A method for measuring the position of a float disposed around a rod submerged in the fuel of an underground fuel storage tank, said method comprising the steps in the order of:
   sending a set of vibrational signals down said rod to vibrate said rod to break the surface tension between said rod and said fuel in order to buoy said float in said fuel based upon the specific gravity of said float so as to minimize any offset error due to surface tension,
   after minimizing said offset error, measuring the level of the float so as to determine the level of the fluid.

21. A method for minimizing offset error due to surface tension of a float disposed around a rod submerged in the fuel of an underground fuel storage tank, said method comprising the steps of:
   generating an electrical set of vibrational signals of predetermined frequency, power and duration,
   producing a set of vibrational signals down said rod upon receipt of said electrical set to vibrate said rod to break the surface tension between said rod and said float in order to buoy said float in said fuel based upon the specific gravities of said float and said fluid so as to minimize surface tension.

* * * * *